(12) United States Patent
Schwartz et al.

(10) Patent No.: US 9,789,756 B2
(45) Date of Patent: Oct. 17, 2017

(54) HYBRID VEHICLE WITH POWER BOOST

(71) Applicant: Palo Alto Research Center Incorporated, Palo Alto, CA (US)

(72) Inventors: David E. Schwartz, San Carlos, CA (US); Bhaskar Saha, Union City, CA (US); Sean Garner, Burlingame, CA (US); Simon Barber, San Francisco, CA (US); Scott E. Solberg, Los Altos, CA (US); Stephen Hoover, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 44 days.

(21) Appl. No.: 14/178,572

(22) Filed: Feb. 12, 2014

(65) Prior Publication Data

US 2015/0224864 A1    Aug. 13, 2015

(51) Int. Cl.
*B60K 6/28* (2007.10)
*B60K 6/46* (2007.10)
(Continued)

(52) U.S. Cl.
CPC .............. *B60K 6/28* (2013.01); *B60K 6/30* (2013.01); *B60K 6/44* (2013.01); *B60K 6/46* (2013.01);
(Continued)

(58) Field of Classification Search
CPC ...... B60W 10/06; B60W 10/08; B60W 20/00; Y02T 10/144; Y02T 10/6286; B60K 6/28;
(Continued)

(56) References Cited

U.S. PATENT DOCUMENTS 3,870,116 A    3/1975 Seliber
3,923,115 A    12/1975 Helling
(Continued)

FOREIGN PATENT DOCUMENTS

EP    0890918    1/1999
EP    0903259    3/2003
(Continued)

OTHER PUBLICATIONS

Duoba, "Engine Design, Sizing and Operation in Hybrid Electric Vehicles", Presentation at University of Wisconsin-Madison, Jun. 8, 2011, 39 pages.
(Continued)

*Primary Examiner* — Hau V Phan
(74) *Attorney, Agent, or Firm* — Hollingsworth Davis, LLC (57) ABSTRACT

A hybrid vehicle includes at least one axle, an energy storage device disposed within the hybrid vehicle, a fuel consuming engine, a power boosting feature, and a controller. The fuel consuming engine is operably connected to selectively provide power to at least one of the energy storage device and the at least one axle. The engine is capable of providing at least the mean but less than a peak power to drive the hybrid vehicle over a typical route. The power boosting feature is configured to provide the fuel consuming engine with additional power to achieve a desired power to accelerate the hybrid vehicle. The controller is adapted to selectively control power flow to the one or more axles from one or more of the energy storage device, the engine, and the power boosting feature to achieve the desired power.

11 Claims, 9 Drawing Sheets

(51) Int. Cl.
| | |
|---|---|
| *B60K 6/44* | (2007.10) |
| *B60K 6/48* | (2007.10) |
| *B60K 6/30* | (2007.10) |
| *B60W 10/06* | (2006.01) |
| *B60W 10/08* | (2006.01) |
| *B60W 20/19* | (2016.01) |
| *B60K 6/52* | (2007.10) |
| *B60W 10/24* | (2006.01) |

(52) U.S. Cl.
CPC ............... *B60K 6/48* (2013.01); *B60K 6/52* (2013.01); *B60W 10/06* (2013.01); *B60W 10/08* (2013.01); *B60W 10/24* (2013.01); *B60W 20/19* (2016.01); *B60W 2510/244* (2013.01); *B60W 2540/10* (2013.01); *Y02T 10/623* (2013.01); *Y02T 10/6217* (2013.01); *Y02T 10/6221* (2013.01); *Y02T 10/6265* (2013.01); *Y02T 10/6286* (2013.01); *Y10S 903/907* (2013.01); *Y10S 903/96* (2013.01)

(58) Field of Classification Search
CPC ... B60K 6/30; B60K 6/44; B60K 6/46; B60K 6/52
See application file for complete search history.

(56) References Cited

U.S. PATENT DOCUMENTS

| | | | |
|---|---|---|---|
| 4,309,620 A | 1/1982 | Bock | |
| 4,423,794 A | 1/1984 | Beck | |
| 4,625,823 A | 12/1986 | Frank | |
| 4,757,686 A * | 7/1988 | Kawamura | F02B 37/10 290/40 C |
| 5,076,059 A * | 12/1991 | Okada | F02B 37/10 123/198 DB |
| 5,406,797 A * | 4/1995 | Kawamura | F02B 37/005 290/52 |
| 5,427,194 A | 6/1995 | Miller | |
| 5,636,509 A | 6/1997 | Abell | |
| 5,713,426 A | 2/1998 | Okamura | |
| 5,931,249 A | 8/1999 | Ellis et al. | |
| 6,018,694 A | 1/2000 | Egami et al. | |
| 6,186,255 B1 | 2/2001 | Shimasaki et al. | |
| 6,205,379 B1 * | 3/2001 | Morisawa | B60L 11/14 180/165 |
| 6,242,873 B1 | 6/2001 | Drozdz et al. | |
| 6,330,498 B2 | 12/2001 | Tamagawa et al. | |
| 6,443,125 B1 | 9/2002 | Mendler | |
| 6,469,402 B2 | 10/2002 | Morimoto et al. | |
| 6,554,088 B2 * | 4/2003 | Severinsky | B60H 1/004 180/65.23 |
| 6,659,212 B2 * | 12/2003 | Geisse | B60K 6/44 180/302 |
| 6,684,863 B2 * | 2/2004 | Dixon | F02D 23/02 123/559.1 |
| 6,823,853 B2 * | 11/2004 | Clarkson | F02B 33/446 123/559.1 |
| 6,931,850 B2 * | 8/2005 | Frank | B60K 6/44 60/597 |
| 6,956,298 B2 | 10/2005 | Kitajima et al. | |
| 6,962,223 B2 | 11/2005 | Berbari | |
| 6,995,529 B2 | 2/2006 | Sibley | |
| 7,076,954 B1 * | 7/2006 | Sopko, Jr. | B60K 6/46 290/52 |
| 7,178,617 B2 | 2/2007 | Morisawa et al. | |
| 7,240,748 B2 | 7/2007 | Kira et al. | |
| 7,597,164 B2 | 10/2009 | Severinsky et al. | |
| 7,654,355 B1 | 2/2010 | Williams | |
| 7,691,027 B2 * | 4/2010 | Soliman | B60K 6/485 477/5 |
| 7,931,107 B2 | 4/2011 | Jones, Jr. | |
| 8,028,778 B2 | 10/2011 | Luo et al. | |
| 8,043,194 B2 * | 10/2011 | Soliman | B60K 6/547 477/174 |
| 8,050,856 B2 | 11/2011 | Duty et al. | |
| 8,079,349 B2 * | 12/2011 | Rauner | F01N 3/225 123/564 |
| 8,142,329 B2 | 3/2012 | Ortmann | |
| 8,176,901 B2 * | 5/2012 | Ai | F02B 33/40 123/559.1 |
| 8,250,864 B2 * | 8/2012 | Pott | B60K 6/48 180/65.1 |
| 8,265,813 B2 | 9/2012 | Heap | |
| 8,359,145 B2 | 1/2013 | Bowman et al. | |
| 8,386,091 B2 | 2/2013 | Kristinsson et al. | |
| 8,615,336 B1 * | 12/2013 | Vos | B60W 20/00 180/65.21 |
| 8,758,193 B2 * | 6/2014 | Ichikawa | B60K 6/44 180/65.23 |
| 8,781,664 B2 * | 7/2014 | Sujan | B60W 10/02 180/65.25 |
| 8,852,051 B2 * | 10/2014 | Sujan | B60W 10/02 477/3 |
| 8,959,912 B2 * | 2/2015 | Hoess | B60K 6/48 123/559.1 |
| 8,972,161 B1 | 3/2015 | Koebler et al. | |
| 9,048,765 B2 * | 6/2015 | Dobbs | F02B 63/042 |
| 9,102,325 B2 * | 8/2015 | Jung | F02D 41/042 |
| 9,108,528 B2 * | 8/2015 | Yang | B60W 20/13 |
| 2002/0065165 A1 | 5/2002 | Lasson et al. | |
| 2007/0012493 A1 * | 1/2007 | Jones | B60L 11/12 180/65.22 |
| 2007/0144175 A1 * | 6/2007 | Sopko, Jr. | F02B 39/10 60/605.1 |
| 2008/0022686 A1 * | 1/2008 | Amdall | B60K 6/12 60/716 |
| 2008/0219866 A1 * | 9/2008 | Kwong | B60K 6/46 417/410.1 |
| 2009/0211384 A1 | 8/2009 | Lass | |
| 2010/0010732 A1 | 1/2010 | Hartman | |
| 2010/0292047 A1 * | 11/2010 | Saito | B60K 6/365 477/5 |
| 2011/0100735 A1 * | 5/2011 | Flett | B60K 6/46 180/65.22 |
| 2011/0295433 A1 * | 12/2011 | Evans | B60W 10/06 700/282 |
| 2012/0109515 A1 * | 5/2012 | Uyeki | G01C 21/3469 701/423 |
| 2012/0130625 A1 | 5/2012 | Srivastava | |
| 2012/0197472 A1 | 8/2012 | He et al. | |
| 2012/0208672 A1 | 8/2012 | Sujan et al. | |
| 2012/0271544 A1 | 10/2012 | Hein et al. | |
| 2012/0290149 A1 | 11/2012 | Kristinsson et al. | |
| 2013/0024179 A1 | 1/2013 | Mazzaro et al. | |
| 2013/0042617 A1 * | 2/2013 | Atkins | B60K 6/105 60/698 |
| 2013/0046526 A1 | 2/2013 | Yucel et al. | |
| 2013/0079966 A1 * | 3/2013 | Terakawa | B60W 10/02 701/22 |
| 2013/0269340 A1 * | 10/2013 | Schumacher | F02B 39/14 60/605.1 |
| 2013/0296107 A1 * | 11/2013 | Nedorezov | B60W 10/02 477/5 |
| 2014/0205426 A1 * | 7/2014 | Costall | F01N 5/04 415/1 |
| 2014/0346865 A1 * | 11/2014 | Akashi | B60L 11/1851 307/10.7 |
| 2015/0019132 A1 | 1/2015 | Gusikhin et al. | |
| 2015/0224864 A1 * | 8/2015 | Schwartz | B60K 6/28 180/65.245 |

(56) References Cited

U.S. PATENT DOCUMENTS

| | | | | |
|---|---|---|---|---|
| 2015/0258986 | A1* | 9/2015 | Hayakawa | B60W 10/06 701/22 |
| 2015/0298684 | A1* | 10/2015 | Schwartz | B60W 10/10 701/22 |

FOREIGN PATENT DOCUMENTS

| | | |
|---|---|---|
| EP | 0933246 | 6/2004 |
| EP | 0916547 | 12/2004 |
| EP | 1442909 | 9/2006 |
| EP | 1869609 | 12/2007 |
| EP | 2251805 | 11/2010 |
| EP | 2369511 | 9/2011 |
| EP | 2055606 | 2/2013 |
| EP | 2055584 | 5/2013 |
| EP | 2067679 | 8/2013 |
| WO | WO2007067842 | 6/2007 |
| WO | WO2008112843 | 9/2008 |
| WO | WO2008125860 | 10/2008 |
| WO | WO2010081836 | 7/2010 |
| WO | WO2011066468 | 6/2011 |

OTHER PUBLICATIONS

"Flywheel Hybrid Vehicle Delivers Up to 22.4% Fuel Economy Improvement", Prodrive, Sep. 12, 2011, 2 pages.
Fu et al., "Real-time Energy Management and Sensitivity Study for Hybrid Electric Vehicles", 2011 American Control Conference, San Francisco, Jun. 29-Jul. 1, 2011, pp. 2113-2118.
Geller, "Increased Understanding of Hybrid Vehicle Design Through Modeling, Simulation, and Optimization", 2010, 98 pages.
Karbowski et al., "PHEV Control Strategy Assessment Through Optimization", DOE Merit Review, Feb. 28, 2008, 9 pages.
Karbowski et al., "PHEV Control Strategy", 2009 DOE Hydrogen Program and Vehicle Technologies Annual Merit Review, May 19, 2009, 18 pages.
Kim, "Instantaneous Optimal Control for Hybrid Electrical Vehicles", DOE Update, Apr. 18, 2011, 21 pages.
Kim et al., Comparison Between Rule-Based and Instantaneous Optimization for a Single-Mode, Power-Split HEV, 2011, 10 pages.
Mahapatra et al., "Model-Based Design for Hybrid Electric Vehicle Systems", The MathWorks, Inc., 2008, 10 pages.
Moawad et al., "Impact of Real World Drive Cycles on PHEV Fuel Efficiency and Cost for Different Powertrain and Battery Characteristics", EVS24 International Batter, Hybrid and Fuel Cell Electric Vehicle Symposium, May 13-16, 2009, pp. 1-10.
Pagerit et al., "Global Optimization to Real Time Control of HEV Power Flow: Example of a Fuel Cell Hybrid Vehicle", printed from the internet on Sep. 3, 2013, 13 pages.
Serrao et al., "Open Issues in Supervisory Control of Hybrid Electric Vehicles: A Unified Approach Using Optimal Control Methods", Oil & Gas Science and Technology, vol. 68, 2013, pp. 23-33.
Stence, "Hybrid Vehicle Control Systems", Portabledesign.com, May 2006, pp. 28-30.
Synopsys, "Hybrid and Electric Vehicle Design", printed from internet on Sep. 13, 2013, 3 pages.
van Keulen et al., "Energy Management in Hybrid Electric Vehicles: Benefit of Prediction", Proceedings of the $6^{th}$ IFAC Symposium on Advances in Automotive Control, Jul. 12-14, 2010, Munich, Germany, pp. 1-6.
van Kuelen et al., "Predictive Cruise Control in Hybrid Electric Vehicles", World Electric Vehicle Journal, vol. 3, May 2009, pp. 1-11.
Zhang et al., "Role of Terrain Preview in Energy Management of Hybrid Electric Vehicles", IEEE Transactions on Vehicular Technology, vol. 59, No. 3, Mar. 2010, pp. 1139-1147.
File History for U.S. Appl. No. 14/255,091.
File History for U.S. Appl. No. 14/255,235.

* cited by examiner

HYBRID VEHICLE WITH POWER BOOST

TECHNICAL FIELD

This application relates generally to hybrid vehicles, and in particular, to arrangements for providing a power boost to hybrid vehicles. The application also relates to components, devices, systems, and methods pertaining to hybrid vehicles.

BACKGROUND

Motor vehicles typically operate using an internal combustible engine to convert the energy in a combustible fuel, such as gasoline or diesel, into mechanical energy to drive the wheels and otherwise operate the motor vehicle. Unfortunately, combustible fuels are expensive and contribute to environmental pollution. Due to these drawbacks, attention has been given to the problems of reduction of fuel consumption and pollutants emitted by automobiles and other highway vehicles.

To alleviate some of these drawbacks, hybrid vehicles of various configurations have been proposed. For example, in some series hybrid vehicles, the vehicle batteries are used to power the wheels via an electric motor, and the internal combustion engine powers a generator and can be operated in its most fuel-efficient output power range while still allowing the electric traction motor (powered by the batteries or the generator) to drive the vehicle. In another configuration, commonly called a parallel hybrid vehicle, the internal combustion engine and electric motor are matched through a complex gear train so that both can provide torque to drive the vehicle. In a parallel hybrid vehicle, the vehicle can be operated in several different modes including a mode where the engine is run at constant speed and excess power is converted by a motor/generator to electrical energy for storage in the batteries. Other hybrid vehicle arrangements and modes of operation are also known.

SUMMARY

A hybrid vehicle includes at least one axle, an energy storage device disposed within the hybrid vehicle, a fuel consuming engine, a power boosting feature, and a controller. The fuel consuming engine is operably connected to selectively provide power to at least one of the energy storage device and the at least one axle. The engine is capable of providing at least the mean but less than a peak power to drive the hybrid vehicle over a typical route. The power boosting feature is configured to provide the fuel consuming engine with additional power to achieve a desired power to accelerate the vehicle. The controller is adapted to selectively control power flow to the one or more axles from one or more of the energy storage device, the engine, and the power boosting feature to achieve the desired power.

A system for the power train of a hybrid vehicle includes one or more axles, a flywheel, a fuel consuming engine, a power boosting feature, and a controller. The flywheel is configured to produce between 10 kWatts and 200 kWatts of power for driving the one or more axles of the hybrid vehicle. The fuel consuming engine is configured to produce between 10 kWatts and 200 kWatts of power. The engine is capable of providing at least the mean but less than a peak power to drive the hybrid vehicle over a typical route. The power boosting feature is configured provide the fuel consuming engine with additional power to achieve a desired power to accelerate the vehicle. The controller is adapted to selectively control power flow to the one or more axles from one or more of the energy storage device, the engine, and the power boosting feature to achieve the desired power.

A method of operating a hybrid vehicle includes providing an energy storage device selectively operable to power one or more axles of the hybrid vehicle, operating a fuel consuming engine to selectively power at least one of the energy storage device and the one or more axles, where the engine is capable of providing at least the mean but less than a peak power to drive the hybrid vehicle over a typical route, monitoring power demand and power availability to be supplied to the one or more axles from one or more of the energy storage device, the fuel consuming engine, and the power boosting feature, and engaging a power boosting feature configured provide the fuel consuming engine with additional mechanical power to achieve a desired power based upon the power demand and power availability to be supplied.

Related assemblies, methods, systems, articles, components, and techniques are also discussed.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates generally to hybrid vehicles with high degrees of hybridization (herein further referred to as "high DOH vehicles"). A high DOH vehicle is a vehicle with a relatively low-powered fueled engine relative to the vehicle's relatively high-powered energy storage device, as compared with conventional battery hybrid vehicles. While there is no exact definition of high DOH, for the purposes of this disclosure, the energy storage device may be considered to have the capability of providing at least half the power of the engine in some embodiments. The petroleum fueled internal combustion engine in a high DOH vehicle is designed to provide somewhat more than the mean power to operate the vehicle, but not necessarily the maximum power required by the vehicle under all circumstances. In some cases, the internal combustion engine when operated normally is incapable of providing the expected peak power demand of the vehicle based upon expected vehicle use patterns.

Limiting the power output of the engine may allow it to operate within a maximum efficiency range as well as decrease the cost and mass of the engine. During normal operating conditions, the engine may have sufficient power to sustain a reasonable velocity on a relatively flat road, to climb a hill at a low velocity, and to accelerate at a relatively slow rate. Because the petroleum fueled engine in the high DOH vehicle is underpowered relative to the vehicle size and performance demands, the high DOH vehicle disclosed herein can use various energy storage devices to provide power, and in some instances, provide extra power to enable faster acceleration and enhanced performance.

In various embodiments, the energy storage device may be a flywheel or an ultracapacitor (also called a supercapacitor) or an electrochemical battery pack. Flywheels and ultracapacitors have high power density, so that the same amount power can be obtained with a smaller and/or less expensive unit than with a battery pack. However, flywheels and ultracapacitors have high power density but low energy density. This means they can provide sufficient power to the vehicle to enable it to accelerate effectively, to increase velocity or climb a hill, or to maintain a high velocity, but only for a limited duration. For example, at full power, ultracapacitors will typically discharge in seconds and flywheels will typically discharge in tens of seconds or minutes. If a driver intends to accelerate when the energy storage element is depleted, the available power will be limited to the power of the engine, which may be insufficient as it is underpowered as discussed previously. This disclosure addresses a situation where the energy storage device (battery pack, flywheel, ultracapacitor, etc.) is depleted or at a low state of charge yet the operator demands additional performance (i.e. additional power to the wheels). In such instances and others, additional performance can be obtained from the internal combustion engine with the inclusion of a power boosting feature in the vehicle power train. The power boosting feature can comprise one or more of a supercharger, a turbocharger, a nitrous oxide injection system, and a variable displacement engine, and variable valve timing.

Figure 1:
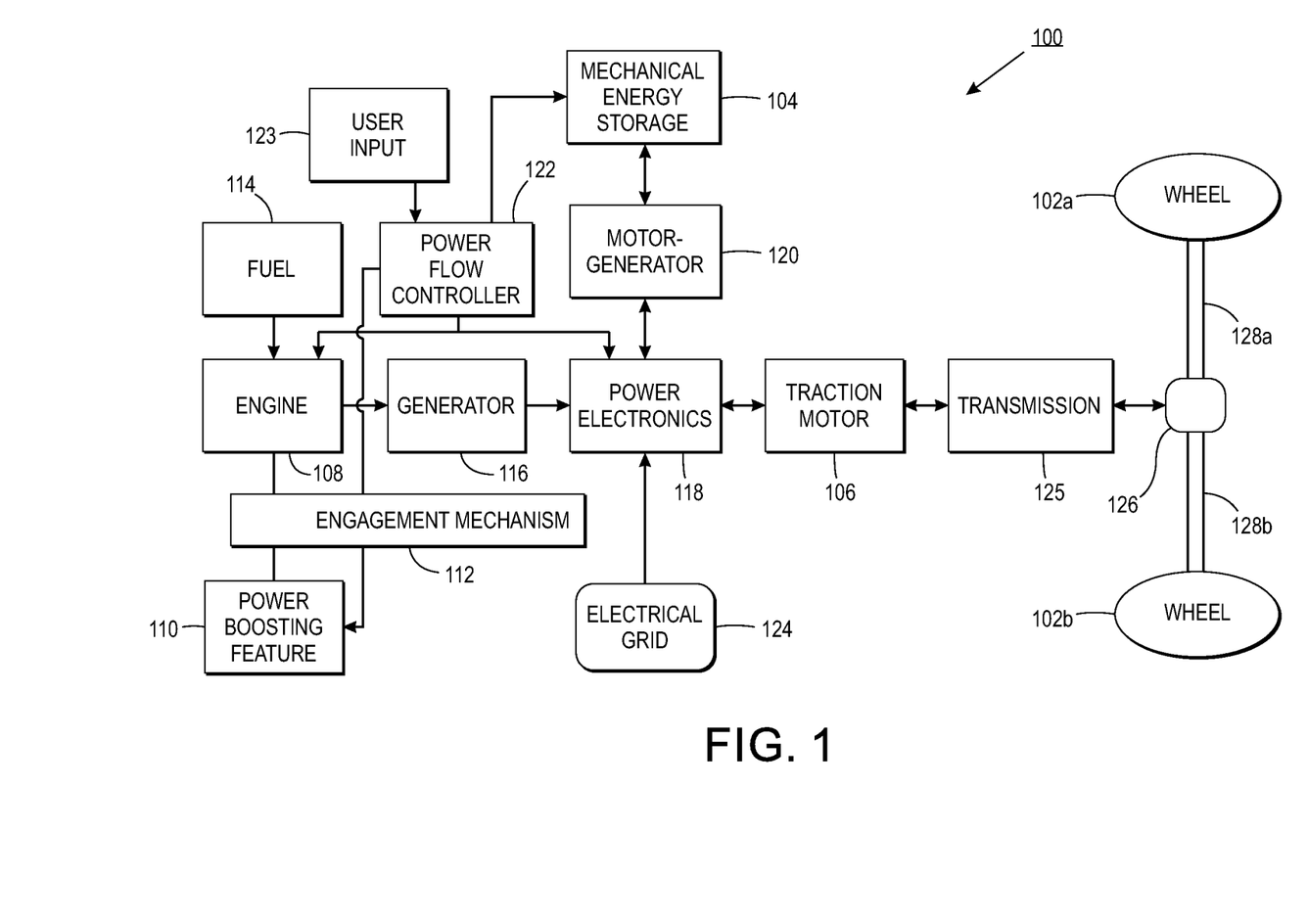
FIG. 1 is schematic diagram of a hybrid vehicle operating in a series hybrid power mode utilizing a mechanical energy storage device.

FIG. 1 shows a diagram of a high DOH vehicle 100 capable of a series hybrid mode of operation. The high DOH vehicle 100 includes two or more wheels 102a and 102b, mechanical energy storage device 104, traction motor 106, internal combustion engine 108, power boosting feature 110, engagement mechanism 112, fuel 114, generator 116, power electronics 118, motor-generator 120, power flow controller 122, user input 123, electrical grid 124, transmission 125, differential(s) 126, and axle(s) 128a and 128b.

The block diagram of FIG. 1 illustrates one embodiment of the high DOH vehicle 100 drive train operating in a series hybrid power mode of operation using mechanical energy storage device 104. Potential power transfer pathways and electrical communication pathways between components are illustrated by arrows in FIG. 1.

In general, the FIGURES illustrate various embodiments of high DOH vehicles as well as potential modes of vehicle operation. These modes include, for example, a series hybrid power mode with mechanical energy storage, a series hybrid power mode with electrical energy storage, a parallel hybrid power mode with mechanical energy storage, a parallel hybrid power mode with electrical energy storage, a power split series-parallel hybrid power mode with electrical energy storage, and various through-the-road hybrid power modes. Additionally, some of these modes of operation (and others not specifically illustrated) can have power to the internal combustion engine 108 boosted by power boosting feature 110. Power flow controller 122, controls the operating mode of various components of the high DOH vehicle 100 as will be discussed subsequently. The power flow controller 122 may include, control circuitry such as one or more microprocessors or computers/computer systems, discrete components, related software, etc.

Wheels 102a and 102b can be coupled in a torque and power transfer relationship to differential(s) 126 via one or more axles 128a and 128b. As illustrated and discussed herein, wheel(s) 102a and 102b can each comprise a single wheel, such as the front passenger-side wheel and front driver-side wheel, or a set of wheels such as the front wheels and rear wheels of the high DOH vehicle 100. Similarly, the axles 128a and 128b can each comprise a portion of a single axle such as the front axle, or two or more axles. Differential(s) 126 can comprise a single differential or two or more differentials and may not be utilized in all embodiments.

Mechanical energy storage device 104 is disposed aboard high DOH vehicle 100 and can comprise a flywheel(s) in some embodiments. Engine 308 is configured to produce between 10 kWatts and 200 kWatts of power while mechanical energy storage device 104, in particular the flywheel, is configured to produce between 10 kWatts and 200 kWatts of power in one embodiment.

As illustrated in FIG. 1, mechanical energy storage device 104 is configured to receive power from motor-generator 120, store power, and output power to motor-generator 120.

As illustrated in FIG. 1, motor-generator 120 outputs power to and is capable of receiving power from power electronics 118. Power electronics 118 are electrically connected to traction motor 106, as well as generator 116 and in some cases electric grid 124 for charging purposes.

In some embodiments, traction motor 106 comprises an AC traction motor. Thus, electrical power from motor-generator 120 would be converted from DC power to AC power by power electronics 118 such as an inverter in some instances. Similarly, electrical power to motor-generator 120 would be converted from AC power to DC power in some embodiments. However, other electric motors may be used, such as, switched reluctance motors, DC permanent magnet motors, repulsion-induction motors, or other suitable electric motors.

As indicated in FIG. 1, one or both of traction motor 106 and motor-generator 120 can function in both an electrical generator mode and in a motor mode according to known electromagnetic induction principles. When working in the generator mode, traction motor 106 can convert mechanical power into electrical power, which may be used to charge mechanical energy storage device 104 in some embodiments. When working in the motor mode, traction motor 106 converts electrical energy into mechanical energy to provide power and torque indirectly or directly to the wheels 102a and 102b. Power and torque can be provided to wheels 102a and 102b via one or more of transmission 125, differential(s) 126, and axle(s) 128a and 128b in some embodiments.

Engine 108 is disposed aboard high DOH vehicle 100 and comprises an internal combustion engine. In one embodiment, engine 108 is capable of providing less than twice as much power as traction motor 106. In further embodiments, engine 108 is capable of providing only about as much power as traction motor 106. In yet further embodiments, engine 108 is configured to produce between 10 kWatts and 200 kWatts of power while traction motor 106 is configured to produce between 10 kWatts and 200 kWatts of power.

When operated, engine 108 utilizes fuel 114 such as gasoline, diesel, or alternative fuels, such as methanol, ethanol, propane, hydrogen, etc. Fuel 114 can also be provided to operate power boosting feature 110 as desired. Engagement mechanism 112 such as a clutch, automatic transmission, or other torque transferring device can be used to selectively facilitate mechanical engagement of the power boosting feature 110 if more power is desired than is provided for by one or both of electrical traction motor 106 and engine 108.

Under normal operating conditions, engine 108 can be capable of providing at least the mean but less than the peak power to drive high DOH vehicle 100 over a typical route. As used herein "normal operating conditions" are conditions where a power boost from power boosting feature 110 is expected to be implemented by the algorithms used to drive high DOH vehicle 100. With the power boost, engine 108 is able to provide peak power to high DOH vehicle 100. Power flow controller 122 is adapted to implement this and other control algorithms to allow high DOH vehicle 100 to operate efficiently yet be able to meet performance goals.

In further embodiments, the amount of power boost provided is based upon the amount of energy available in the mechanical energy storage device 104. Additionally, the amount can be based upon a combination of load demand, power availability from various components, and/or user input 123, (e.g., user preferences and settings), etc. Power/load demand can be measured and monitored by a combination of power applied to axle(s) 128a and 128b and a pedal position or amount of throttle. Additionally, the power flow controller 122 is adapted monitor a threshold energy stored in mechanical energy storage device 104 (i.e., the mechanical storage device's power availability). Thus, power flow controller 122 can be adapted to selectively operate the power boosting feature 110 based on a combination of driver demand for power (e.g., stepping on the gas pedal), and the threshold energy stored in mechanical energy storage device 104 in some embodiments. If sufficient energy is available in mechanical energy storage device 104, the power boosting feature 110 would not be engaged to assist in vehicle performance.

Power flow controller 122 can be adapted to monitor and control power flow to one or more axles 128a and 128b from mechanical energy storage device 104, engine 108, power boosting feature 110, and traction motor 106 (via power electronics 118). Additionally and/or alternatively, power flow controller 122 can be adapted to monitor and control the effects on power flow of any braking or regenerative braking by one or more wheel(s) 102a and 102b. Similarly, power flow controller 122 can additionally or alternatively be adapted to monitor and control power flow from engine 108 to mechanical energy storage device 104 in some instances. In some instances the power flow controller 122 can monitor "state of charge" in mechanical energy storage device 104 and use this as an input to a control algorithm. Additionally or alternatively, power flow controller 122 can be fed back indicia such as "instantaneous power" and "state of health" from mechanical energy storage device 104.

As discussed, power boosting feature 110 is configured to boost power from engine 108 and can comprise one or more of a supercharger, a turbocharger, a nitrous oxide injection system, a variable displacement engine, and variable valve timing. A supercharger is a mechanical device that compresses the air supplied to an internal combustion engine, increasing its power. A turbocharger is a similar device driven by a turbine powered by the vehicle exhaust gas instead of by the engine itself. A nitrous oxide injection system injects nitrous oxide into the engine to increase power. A variable displacement engine selectively utilizes additional cylinders of the engine to provide additional power as desired. Variable valve timing is the process of altering the timing of a valve lift event in engine 108, and is known to improve performance, fuel economy and/or emissions. Variable valve timing can be achieved using mechanical devices (e.g., cam switching, cam phasing, cam oscillation, eccentric cam drive, cam lobe, helical cam shaft), electro-hydraulic and camless systems.

High DOH vehicle 100 is configured to pass power from engine 108 to generator 116 by known means during operation. Generator 116 can be used to provide power to operate power electronics 118 which pass power to mechanical energy storage device 104 and/or wheel(s) 102a and 102b via traction motor 106 as desired.

During operation, traction motor 106 can be connected to drive wheels 102a and 102b though transmission 125, differential(s) 126 or another torque transfer/gear balancing arrangement as illustrated in FIG. 1. Differential(s) 126 permit rotation of opposing wheels, such as the left front wheel and the right front wheel, at different rotational speeds to facilitate turning and cornering without tire slippage.

Engine 108 powers generator 116, which is some modes in turn passes power to mechanical energy storage device 104 and/or traction motor 106. In yet other embodiments, both engine 108 and mechanical energy storage device 104 can provide power to traction motor 106 simultaneously. In addition, traction motor 106 may provide power to mechanical energy storage device 104 through regenerative braking or other mechanism in some modes of operation.

Figure 2:
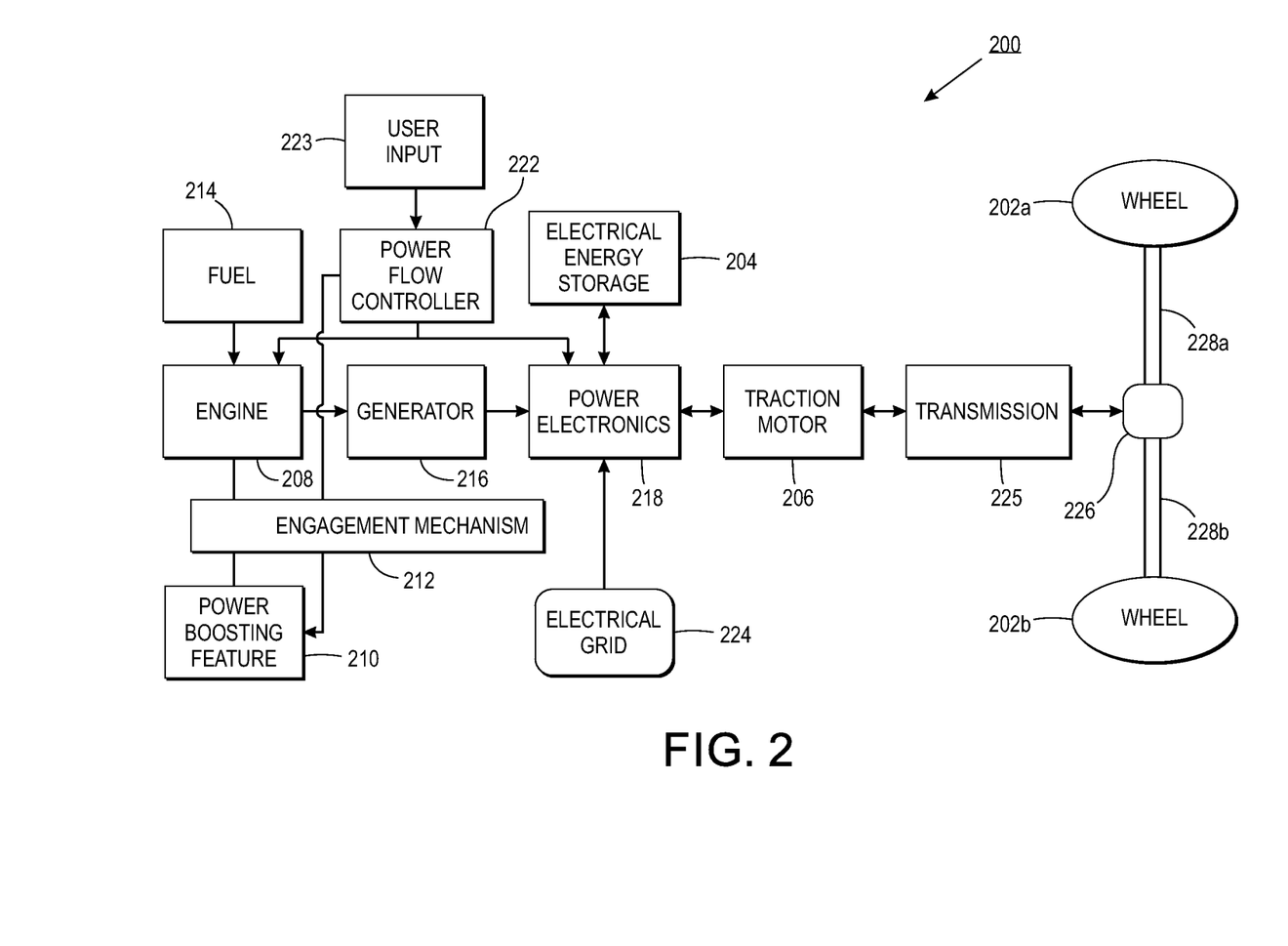
FIG. 2 is schematic diagram of a hybrid vehicle operating in a series hybrid power mode utilizing an electrical energy storage device.

FIGS. 1 and 2 illustrate embodiments of high DOH vehicles 100 and 200 operating in a series hybrid power mode. A series hybrid power mode means that the internal combustion engine provides torque only to the generator to generate electricity, and that no torque from the internal combustion engine is directly fed to the drive wheels. Multiple submodes within the series hybrid power mode may be provided and only two are illustrated in FIGS. 1 and 2.

In FIG. 2, a diagram of high DOH vehicle 200 is provided and illustrates various components of high DOH vehicle 200 including two or more wheels 202a and 202b, electrical energy storage device 204, traction motor 206, internal combustion engine 208, power boosting feature 210, engagement mechanism 212, fuel 214, generator 216, power electronics 218, power flow controller 222, user input 223, electrical grid 224, transmission 225, differential(s) 226, and axle(s) 228a and 228b.

The general configuration and operation of the various components of high DOH vehicle 200 has been provided in reference to FIG. 1, and therefore, will not be discussed in great detail with reference to FIG. 2. FIG. 2 illustrates a series hybrid power mode of operation that utilizes electrical energy storage devices 204 such as battery pack(s) and/or ultracapacitor(s). Potential power transfer pathways and electrical communication pathways between components are illustrated by arrows in FIG. 2. For example, engine 208 is operative to provide mechanical power to generator 216 which converts the mechanical power to electrical power for charging electrical energy storage device 204 in some instances. In other instances, the electrical power from generator 216 is used to operate traction motor 206 which provides torque/power to wheel(s) 202a and 202b. In addition, traction motor 206 may charge electrical energy storage device 204 through regenerative braking or other mechanism in some modes of operation.

As illustrated in FIG. 2, engagement mechanism 212 such as a clutch, automatic transmission, or other torque transferring device can be used to selectively facilitate engaging the power boosting feature 210 as controlled by power flow controller 222 if more power is desired than is provided for by one or both of electrical traction motor 206 and engine 208.

Figure 3:
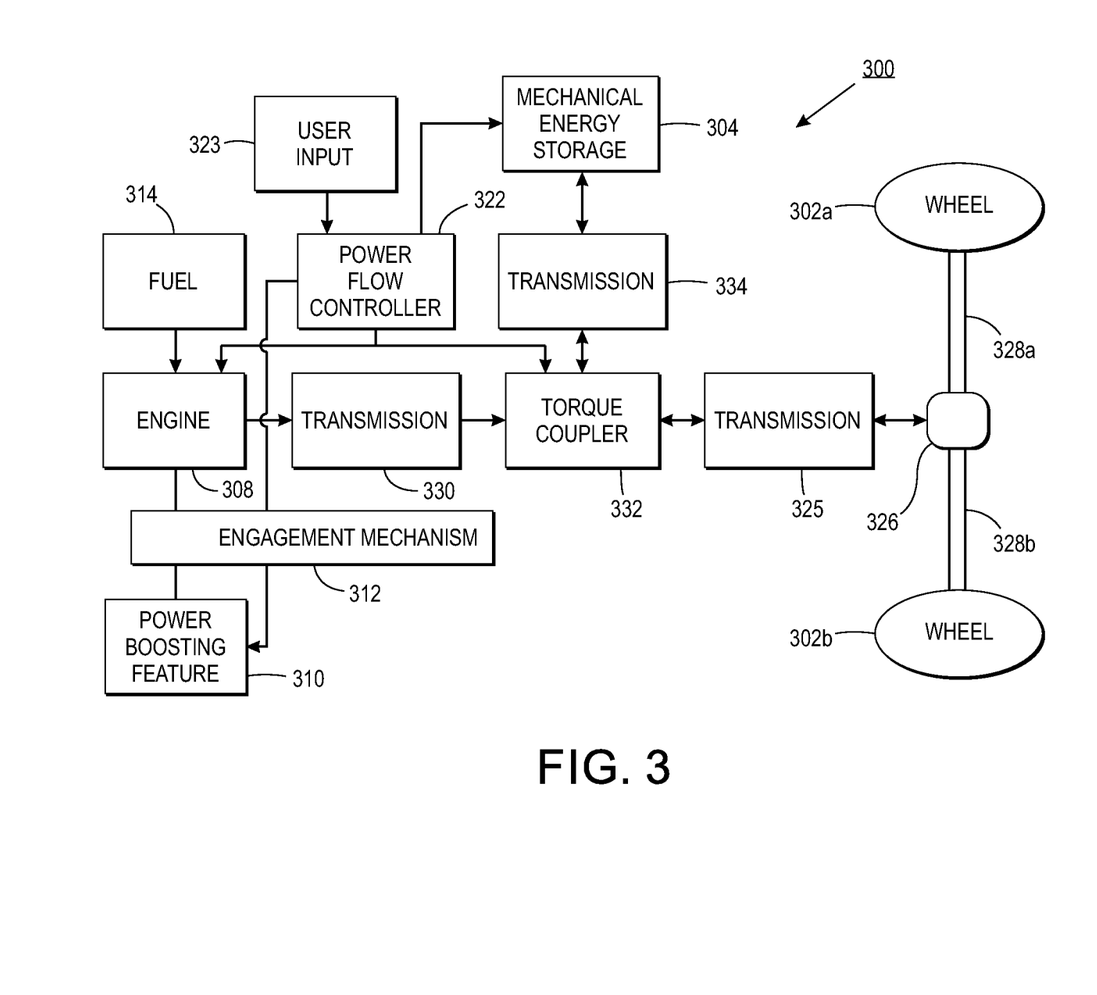
FIG. 3 is a schematic diagram of a hybrid vehicle operating in a parallel hybrid power mode utilizing a mechanical energy storage device.

FIG. 3 is a diagram of another high DOH vehicle 300 embodiment operating in a parallel hybrid power mode utilizing mechanical energy storage device 304. A parallel hybrid power mode uses the internal combustion engine to selectively provide torque/power to drive the wheels, typically through an arrangement of torque coupler 332 such as a clutch or other engagable mechanical arrangement. Torque/power is also selectively be provided to the wheels by torque coupler 332 powered by mechanical energy storage device 304. The mechanical energy storage device 304 and engine 308 can work in tandem or on their own accord to deliver power. Additionally, engine 308 can provide power to mechanical energy storage device 304, which can stored as energy for later use. Multiple sub-modes within the parallel hybrid power mode may be utilized in various embodiments, only two exemplary embodiments are described.

FIG. 3 illustrates components of high DOH vehicle 300 including two or more wheels 302a and 302b, mechanical energy storage device 304, internal combustion engine 308, power boosting feature 310, engagement mechanism 312, fuel 314, power flow controller 322, user input 323, transmission 325, differential(s) 326, axle(s) 328a and 328b, transmission 330, torque coupler 332, and transmission 334.

In FIG. 3, high DOH vehicle 300 is configured such that engine 308 can drive wheel(s) 302a and 302b via some or all of transmission 330, torque coupler 332, transmission 325, differential(s) 326, and/or axle(s) 328a and 328b. Additionally, engine 308 can provide power to mechanical energy storage device 304 through transmission 330, torque coupler 332, and transmission 334. Energy is stored in mechanical energy storage device 304 and can be used to power wheel(s) 302a and 302b via some or all of transmission 334, torque coupler 332, transmission 325, differential(s) 326, and/or axle(s) 328a and 328b as desired.

Engagement mechanism 312 such as a clutch can be used to selectively facilitate engaging the power boosting feature 310 as controlled by power flow controller 322 if more power is desired than is provided for by one or more components including engine 308.

Figure 4:
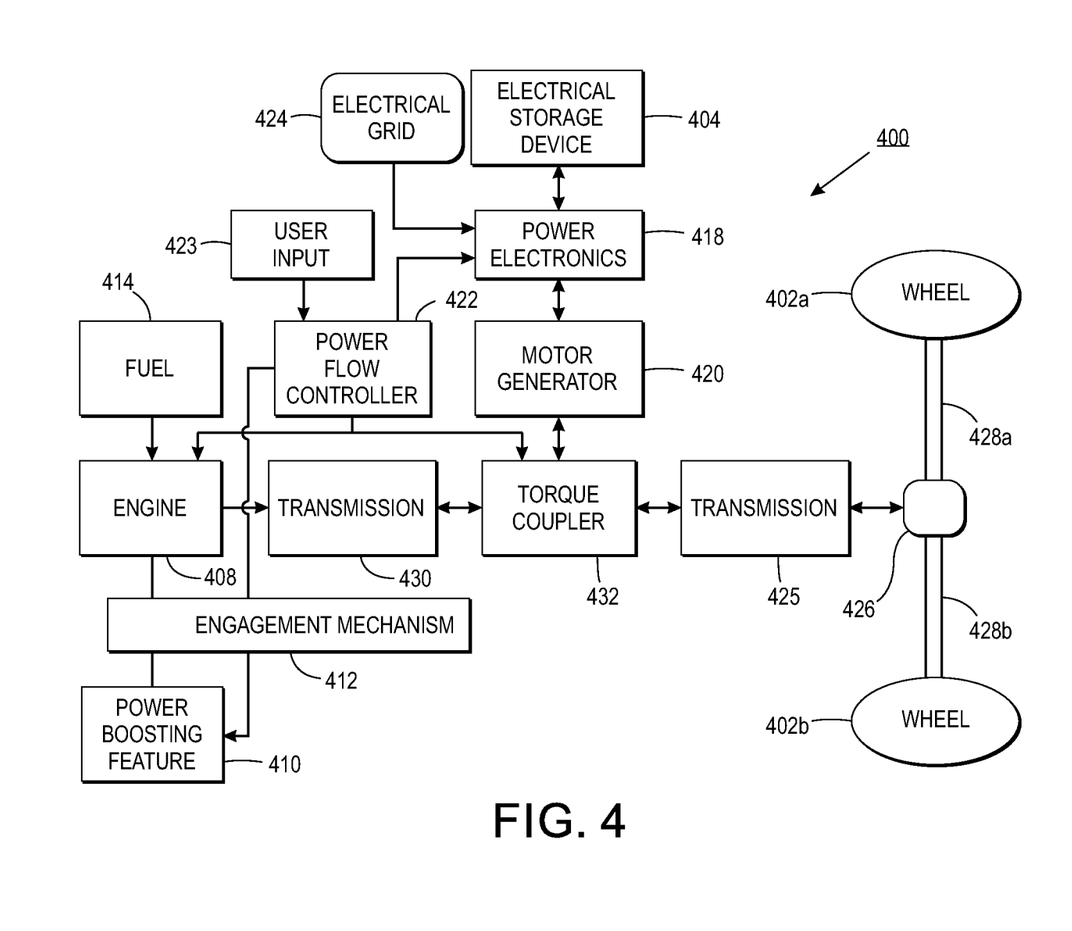
FIG. 4 is a schematic diagram of a hybrid vehicle operating in a parallel hybrid power mode utilizing electrical energy storage device.

FIG. 4 is a diagram of another high DOH vehicle 400 embodiment operating in a parallel hybrid power mode utilizing electrical energy storage device 404. FIG. 4 illustrates components of high DOH vehicle 400 including two or more wheels 402a and 402b, electrical energy storage device 404, internal combustion engine 408, power boosting feature 410, engagement mechanism 412, fuel 414, power electronics 418, motor-generator 420, power flow controller 422, user input 423, electrical grid 424, transmission 425, differential(s) 426, axle(s) 428a and 428b, transmission 430, and torque coupler 432.

High DOH vehicle 400 is configured such that engine 408 can drive wheel(s) 402a and 402b via some or all of transmission 430, torque coupler 432, transmission 425, differential(s) 426, and/or axle(s) 428a and 428b. Additionally, engine 408 can provide power for electrical energy storage device 404 through transmission 430, torque coupler 432, motor-generator 420, and power electronics 418. Electrical energy storage device 404 can also be powered by electrical grid 424 in some instances. Energy is stored in electrical energy storage device 404 and can be used to power wheel(s) 402a and 402b via some or all of power electronics 418, motor-generator 420, torque coupler 432, transmission 425, differential(s) 426, and/or axle(s) 428a and 428b as desired.

Engagement mechanism 412 such as a clutch can be used to selectively facilitate engaging the power boosting feature 410 as controlled by power flow controller 422 if more power is desired than is provided for by one or more components including engine 408.

Figure 5:
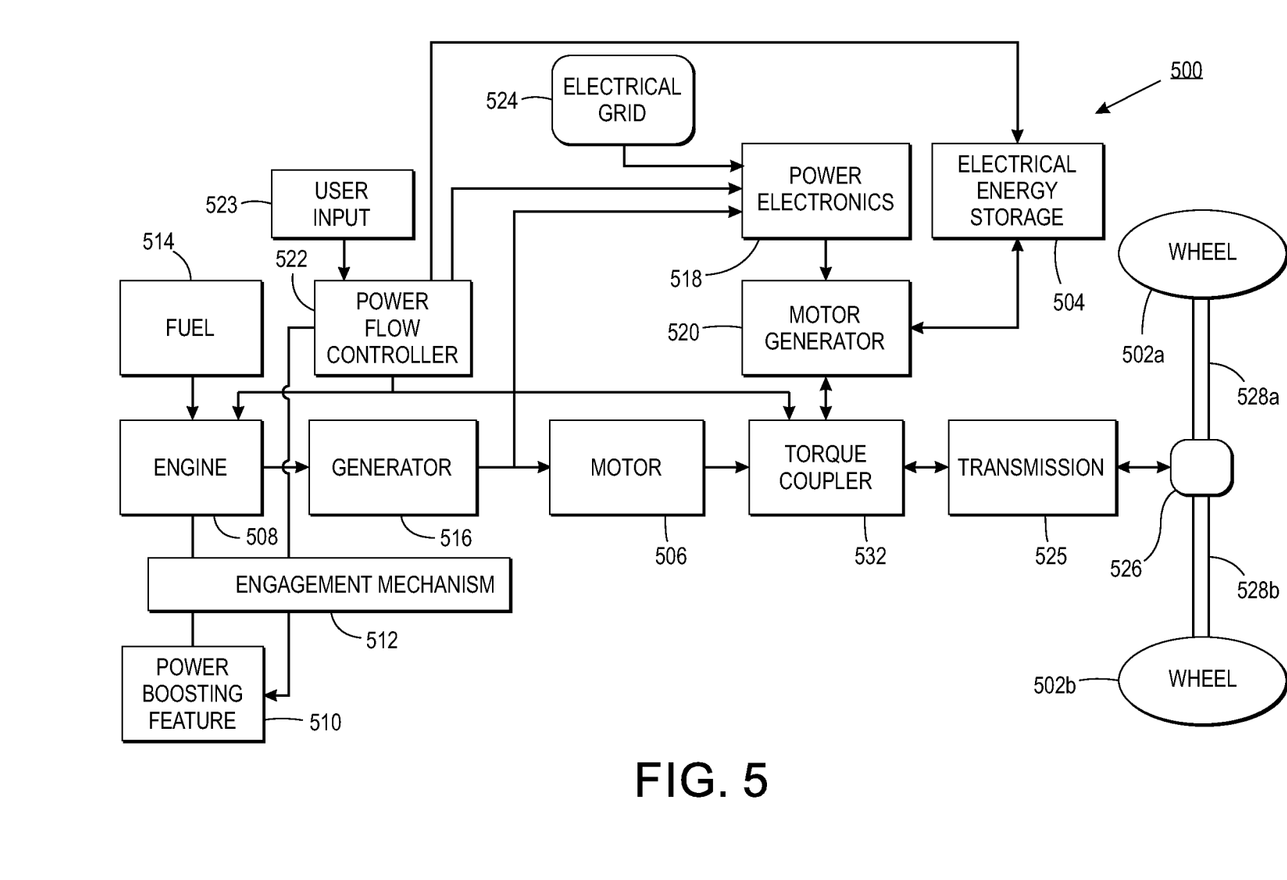
FIG. 5 is a schematic diagram of a hybrid vehicle operating in a power-split (series-parallel) hybrid power mode utilizing a mechanical energy storage device.
Figure 6:
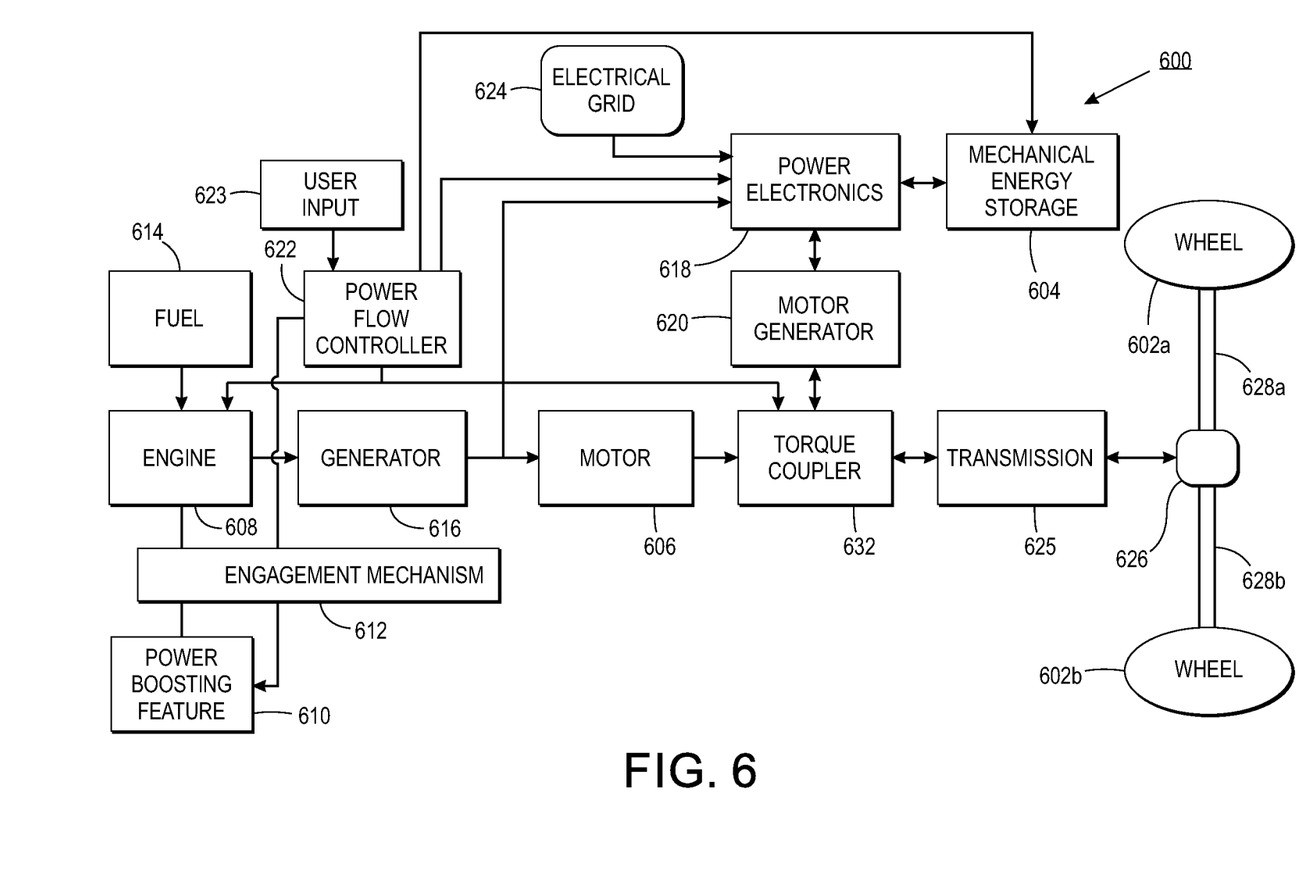
FIG. 6 is a schematic diagram of a hybrid vehicle operating in a power-split (series-parallel) hybrid power mode utilizing an electrical energy storage device.

FIGS. 5 and 6 illustrate embodiments of high DOH vehicles 500 and 600 operating in a power-split (series-parallel) hybrid power mode. A power-split (series-parallel) hybrid power mode combines aspects and functionality of both the series hybrid power mode and the parallel hybrid power mode into one vehicle. In particular, power can take various routes from generator 516 and need not only travel to motor 506 as with a series hybrid power mode configuration. Thus, motor 506 may not be operated in some instances. Instead power can additionally or alternatively be routed from generator 516 through power electronics 518 to motor-generator 520 where it can be further directed to one or more of mechanical energy storage device 504 or through torque coupler 532 to one or more wheel(s) 502a and 502b.

FIG. 5 is a diagram of high DOH vehicle 500 operating in the power-split (series-parallel) hybrid power mode utilizing mechanical energy storage device 504. FIG. 5 illustrates components of high DOH vehicle 500 including two or more wheels 502a and 502b, mechanical energy storage device 504, motor 506, internal combustion engine 508, power boosting feature 510, engagement mechanism 512, fuel 514, power electronics 518, motor-generator 520, power flow controller 522, user input 523, electrical grid 524, transmission 525, differential(s) 526, axle(s) 528a and 528b, and torque coupler 532.

Potential power transfer pathways and electrical communication pathways between components are illustrated by solid arrows in FIG. 5. For example, engine 508 is operative to provide mechanical power to generator 516 which converts the mechanical power to electrical power for operating motor 506 in some instances. In other instances, the electrical power from generator 516 is routed through power electronics 518 and motor-generator 520 and stored in mechanical energy storage device 504. In yet other instances, the power from generator 516 is routed through power electronics 518, motor-generator 520, and torque coupler 532 and used to provide power to wheel(s) 502a and 502b. In yet another mode of operation, the mechanical energy storage device 504 can also be powered by electrical grid 524 using power electronics 518 and motor-generator 520 in some instances. Energy is stored in mechanical energy storage device 504 and can be used to power wheel(s) 502a and 502b via one or more of motor-generator 520, torque coupler 532, transmission 525, differential(s) 526, and/or axle(s) 528a and 528b as desired. Additionally, two or more of the various submodes of power flow just discussed can occur simultaneously during operation of the high DOH vehicle 500 as dictated by the power flow controller 522 and other control circuitry.

Engagement mechanism 512 such as a clutch can be used to selectively facilitate engaging the power boosting feature 510 as controlled by power flow controller 522 if more power is desired than is provided for by one or more components including engine 408.

FIG. 6 is a diagram of high DOH vehicle 600 operating in the power-split (series-parallel) hybrid power mode utilizing electrical energy storage device 604. FIG. 6 illustrates components of high DOH vehicle 600 including two or more wheels 602a and 602b, electrical energy storage device 604, motor 606, internal combustion engine 608, power boosting feature 610, engagement mechanism 612, fuel 614, power electronics 618, motor-generator 620, power flow controller 622, user input 623, electrical grid 624, transmission 625, differential(s) 626, axle(s) 628a and 628b, and torque coupler 632.

The general configuration and operation of the various components of high DOH vehicle 600 has been provided in reference to FIG. 5, and therefore, will not be discussed in great detail with reference to FIG. 6. In particular, the differences between high DOH vehicle 500 and high DOH vehicle 600 can include that the power from generator 616 is routed through power electronics 618 directly to electrical energy storage device 604 without passing through motor-generator 620. Thus, when electrical energy storage device 604 discharges power, the power is routed through power electronics 618 before passing to motor-generator 620.

Figure 7:
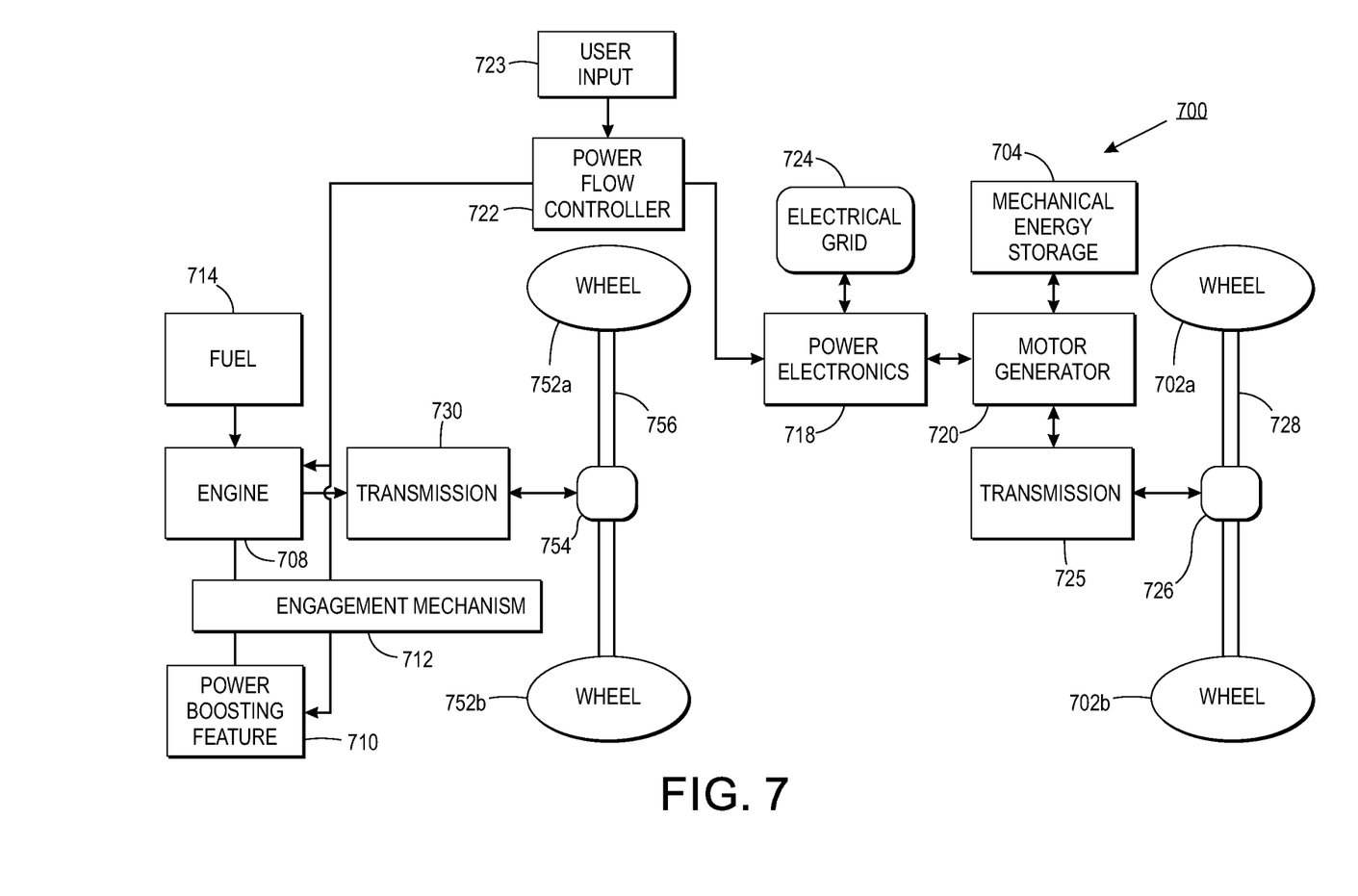
FIGS. 7 to 9 illustrate various embodiments of hybrid vehicles operating in a through-the-road hybrid power mode.
Figure 8:
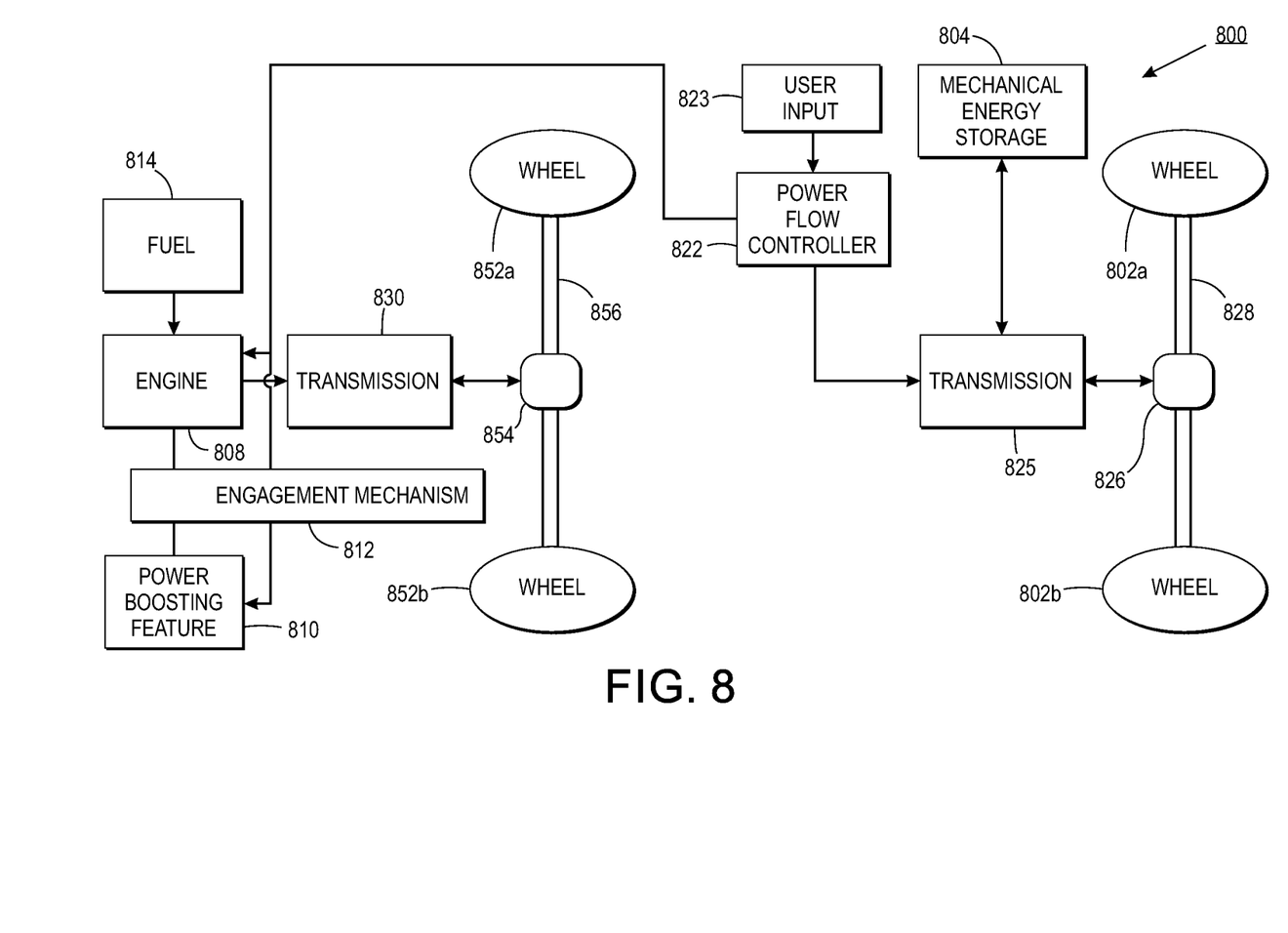
Figure 9:
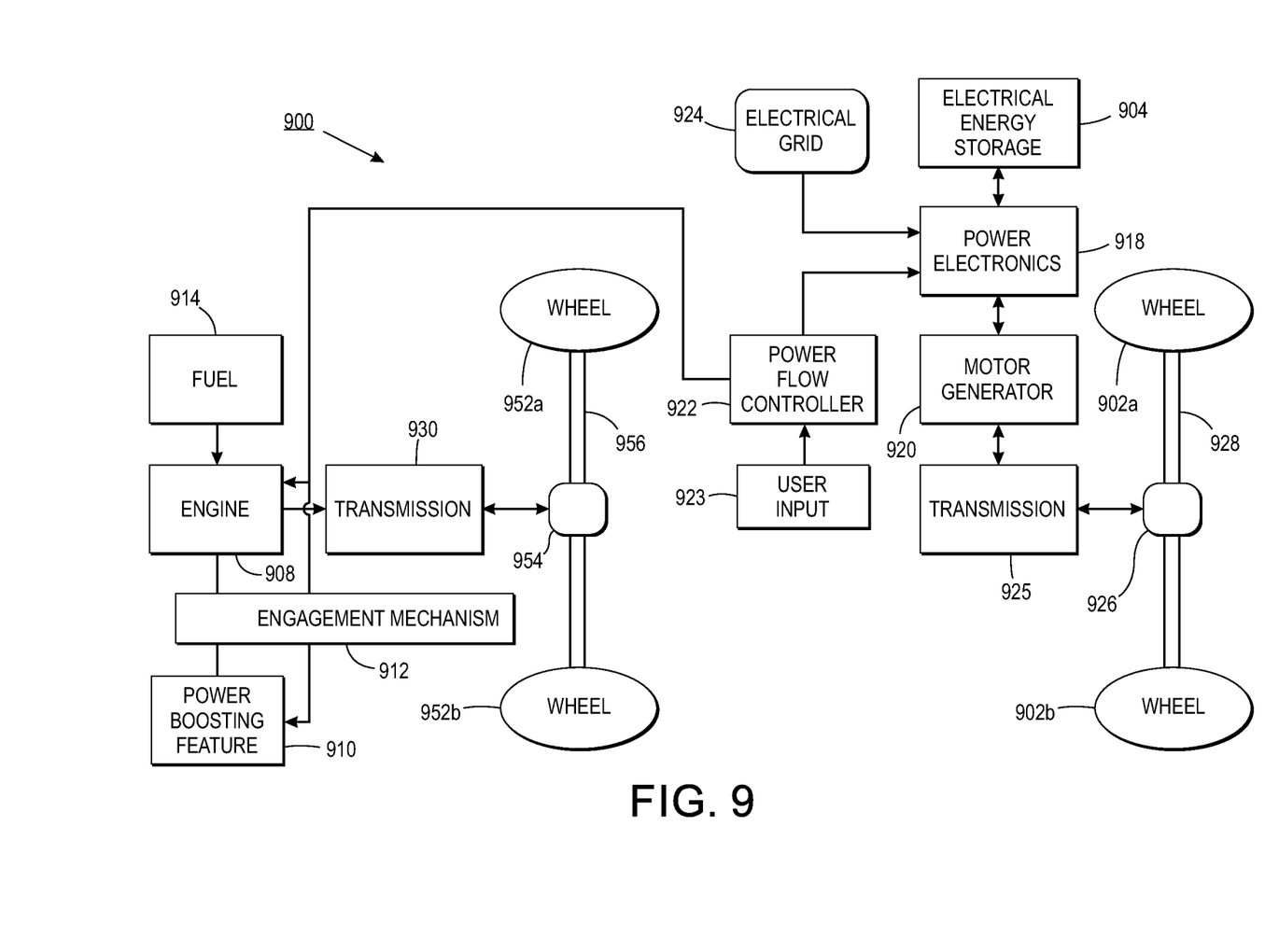

FIGS. 7 to 9 illustrate embodiments of high DOH vehicles 700, 800, and 900 operating in a through-the-road hybrid power mode. A through-the-road hybrid power mode uses the internal combustion engine to provide torque/power to drive one set of wheels, typically through an arrangement of a transmission such as a clutch or other engagable mechanical arrangement. Power is also selectively provided to another set of wheels from the energy storage device. Again, multiple sub-modes within the through-the-road hybrid power mode may be utilized in various embodiments, only three embodiments are described herein in reference to FIGS. 7, 8, and 9.

With regard to the embodiment of FIG. 7, high DOH vehicle 700 includes two sets of independently driven wheels 702a, 702b and 752a and 752b, mechanical energy storage device 704, engine 708, power boosting feature 710, engagement mechanism 712, fuel 714, power electronics 718, motor-generator 720, power flow controller 722, user input 723, electrical grid 724, transmission 725, transmission 730, differential(s) 726 and 754, and axles 728 and 756.

In the through-the-road power arrangement shown in FIG. 7, wheels 752a and 752b comprise two or more wheels that are coupled to one or more axle(s) 756. Wheels 752a and 752b are driven by engine 708 via transmission 730 independently of wheels 702a and 702b. Wheels 702a and 702b comprise two or more wheels that are coupled to one or more axles 728. Wheels 702a and 702b are driven by motor-generator 720 using power either from electrical grid 724 and/or mechanical energy storage device 704. As illustrated, power flow controller 722 is responsive to user input 723 and also communicates with engine 708 and other components including mechanical energy storage device 704 through power electronics 718 to monitor and control power flow to wheels 752a and 752b and wheels 702a and 702b.

Engagement mechanism 712 such as a clutch can be used to selectively facilitate engaging the power boosting feature 710 as controlled by power flow controller 722 if more power is desired than is provided for by one or more components including engine 708.

In FIG. 8, high DOH vehicle 800 includes two sets of independently driven wheels 802a, 802b and 852a and 852b, mechanical energy storage device 804, engine 808, power boosting feature 810, engagement mechanism 812, fuel 814, power flow controller 822, user input 823, transmission 825, transmission 830, differential(s) 826 and 854, and axles 828 and 856.

The general configuration and operation of the various components of high DOH vehicle 800 has been provided in reference to FIG. 7, and therefore, will not be discussed in great detail with reference to FIG. 8. In particular, the differences between high DOH vehicle 700 and high DOH vehicle 800 can include the elimination of power electronics and the elimination of the ability to charge mechanical energy storage device 804 from the electrical grid. Mechanical energy storage device 804 can directly drive transmission 825 rather than driving motor-generator as disclosed in the embodiment of FIG. 7.

As illustrated, power flow controller 822 is responsive to user input 823 and also communicates with engine 808 and other components including mechanical energy storage device 804 through transmission 825 to monitor and control power flow to wheels 852a and 852b and wheels 802a and 802b.

Engagement mechanism 812 such as a clutch can be used to selectively facilitate engaging the power boosting feature 810 as controlled by power flow controller 822 if more power is desired than is provided for by one or more components including engine 808.

In the through-the-road power arrangement shown in FIG. 9, wheels 952a and 952b comprise two or more wheels that are coupled to one or more axle(s) 956 and 928. Wheels 952a and 952b are driven by engine 908 (consuming fuel 914) via transmission 930 independently of wheels 902a and 902b. Wheels 902a and 902b comprise two or more wheels that are coupled to one or more axles 928, and are driven by motor-generator 920 via transmission 925 using power either from electric grid 924 and/or electrical energy storage device 904. As illustrated, power flow controller 922 is responsive to user input 923 and also communicates with engine 908 and other components including electrical energy storage device 904 through power electronics 918 to monitor and control power flow to wheels 952a and 952b and wheels 902a and 902b.

Engagement mechanism 912 such as a clutch can be used to selectively facilitate engaging the power boosting feature 910 as controlled by power flow controller 922 if more power is desired than is provided for by one or more components including engine 908.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

The invention claimed is:
1. A hybrid vehicle, comprising:
   at least one axle;
   an energy storage device disposed within the hybrid vehicle;
   a fuel consuming engine operably connected to selectively provide power to at least one of the energy storage device and the at least one axle, wherein the fuel consuming engine is capable of providing less than a desired power to accelerate the hybrid vehicle;

a power boosting feature configured to provide the fuel consuming engine with additional power to achieve the desired power to accelerate the hybrid vehicle; and a controller adapted to selectively control power flow to the at least one axle from one or more of the energy storage device, the fuel consuming engine, and the power boosting feature to achieve the desired power based on indicia of a state of charge and a state of health received from the energy storage device, wherein the controller is responsive to a user input and is adapted to selectively engage the power boosting feature based on a combination of driver demand for power, a threshold energy stored in the energy storage device, and the user input, the user input comprising a user preference and setting.

2. The hybrid vehicle of claim 1, wherein the controller is adapted to monitor and control power flow from the fuel consuming engine to the energy storage device.

3. The hybrid vehicle of claim 1, wherein the energy storage device comprises one or more of a flywheel, an ultracapacitor, and a battery pack.

4. The hybrid vehicle of claim 1, further comprising:

a traction motor configured to provide power to the at least one axle to propel the hybrid vehicle; and a generator operably driven by the fuel consuming engine and configured to provide power to at least one of the traction motor and the energy storage device.

5. The hybrid vehicle of claim 1, further comprising:

a traction motor configured to power to the at least one axle to propel the hybrid vehicle; and a torque coupler configured to selectively pass power from one or more of the traction motor, the fuel consuming engine, and the energy storage device to drive the at least one axle.

6. The hybrid vehicle of claim 1, wherein both the fuel consuming engine and the energy storage device selectively provide power to the at least one axle.

7. The hybrid vehicle of claim 1, wherein the at least one axle comprises at least a first axle and a second axle, and wherein the fuel consuming engine provides power to the first axle and the energy storage device provides power to the second axle.

8. The hybrid vehicle of claim 1, wherein the power boosting feature comprises one or more of a turbocharger, a supercharger, a nitrous oxide injection system, one or more cylinders of a variable displacement engine, and variable valve timing.

9. The hybrid vehicle of claim 1, wherein:

the energy storage device comprises a flywheel configured to produce between 10 kWatts and 200 kWatts of power;

the fuel consuming engine is configured to produce between 10 kWatts and 200 kWatts of power; and the power boosting feature comprises a supercharger.

10. The hybrid vehicle of claim 1, wherein the fuel consuming engine is capable of providing less than twice as much power as the energy storage device.

11. The hybrid vehicle of claim 1, wherein the controller is further configured to selectively control power flow to the at least one axle from one or more of the energy storage device, the fuel consuming engine, and the power boosting feature to achieve the desired power based on indicia of instantaneous power received from the mechanical energy storage device.

* * * * *